United States Patent
Suzuki et al.

(10) Patent No.: US 8,683,783 B2
(45) Date of Patent: Apr. 1, 2014

(54) EXHAUST PURIFICATION APPARATUS FOR INTERNAL COMBUSTION ENGINE

(75) Inventors: Yasuko Suzuki, Kawasaki (JP); Hiroaki Fujita, Kawasaki (JP); Satoshi Hiranuma, Kawasaki (JP); Shinichi Saito, Kawasaki (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 563 days.

(21) Appl. No.: 12/920,795

(22) PCT Filed: Mar. 24, 2009

(86) PCT No.: PCT/JP2009/055810
§ 371 (c)(1),
(2), (4) Date: Dec. 13, 2010

(87) PCT Pub. No.: WO2009/119574
PCT Pub. Date: Oct. 1, 2009

(65) Prior Publication Data
US 2011/0088375 A1 Apr. 21, 2011

(30) Foreign Application Priority Data
Mar. 27, 2008 (JP) .................................. 2008-083444

(51) Int. Cl.
*F01N 3/24* (2006.01)
(52) U.S. Cl.
USPC .......................................................... 60/286
(58) Field of Classification Search
USPC .......................................................... 60/286
See application file for complete search history.

(56) References Cited

U.S. PATENT DOCUMENTS

| | | | |
|---|---|---|---|
| 2004/0079231 A1* | 4/2004 | Green et al. | 95/280 |
| 2006/0035183 A1* | 2/2006 | Carroni et al. | 431/7 |
| 2008/0041045 A1* | 2/2008 | Zhan | 60/301 |

FOREIGN PATENT DOCUMENTS

| | | | |
|---|---|---|---|
| JP | 2002-213233 A | | 7/2002 |
| JP | 2002213233 A | * | 7/2002 |
| JP | 2006-183509 A | | 7/2006 |
| JP | 2007-239486 A | | 9/2007 |
| JP | 2009-144614 A | | 7/2009 |

OTHER PUBLICATIONS

Translation of JP Patent No. 2002213233A.*
Written Opinion of the International Searching Authority issued in related PCT/JP2009/055810, mailed Jul. 14, 2009.
International Search Report issued in related PCT/JP2009/055810, mailed Jul. 14, 2009.

* cited by examiner

*Primary Examiner* — Thomas Denion
*Assistant Examiner* — Brandon Lee
(74) *Attorney, Agent, or Firm* — Rossi, Kimms & McDowell LLP

(57) ABSTRACT

Disclosed is an exhaust purification device for an internal combustion engine provided with a venturi-shaped mixing chamber (13) upstream of a NOx catalyst (16), said mixing chamber (13) formed continuously from a tapering part (13a) along which the radius decreases in the downstream direction, a waist part (13b) at which the radius is at smallest, and a widening part (13c) along which the radius increases in the downstream direction. A vane plate (18) and an aqueous urea solution spray nozzle (19) are arranged inside the tapering part (13a). The ratio (a/b) of the distance (a) between the vane plate (18) and the center of the waist part (13b) and the distance (b) between the center of the waist part (13b) and the mouth of the NOx catalyst (16) is set between 0.5 and 1.0.

3 Claims, 3 Drawing Sheets

US 8,683,783 B2

EXHAUST PURIFICATION APPARATUS FOR INTERNAL COMBUSTION ENGINE

This application is a U.S. National Phase Application of PCT International Application PCT/JP2009/055810 filed on Mar. 24, 2009 which is based on and claims priority from JP 2008-083444 filed on Mar. 27, 2008, the contents of which are incorporated herein by reference in their entirety.

TECHNICAL FIELD

The present invention relates to exhaust purification apparatus for internal combustion engines, and more particularly, to an exhaust purification apparatus having a venturi-shaped mixing chamber arranged upstream of a catalytic device.

BACKGROUND ART

In this type of exhaust purification apparatus, an additive injected into an exhaust gas of an internal combustion engine is supplied to a catalytic device, which then purifies the exhaust gas by using the additive. In order for the catalytic device to purify the exhaust gas with high efficiency, two requirements need to be fulfilled, one being that the additive should be satisfactorily mixed with the exhaust gas, and the other being that the exhaust gas mixed with the additive should be supplied as uniformly as possible to substantially the entire inlet area of the catalytic device. Various measures have hitherto been taken to meet the requirements, and one of the measures is described in, for example, Patent Document 1.

In the exhaust purification apparatus disclosed in Patent Document 1, a casing containing a DPF is arranged in an exhaust passage of an internal combustion engine. The casing has a large-diameter part located downstream of the DPF, and a vane plate for producing a swirl flow is arranged in the large-diameter part of the casing. The large-diameter part having the vane plate arranged therein is connected to a downstream-side small-diameter part through a flow contraction part with a gradually decreasing diameter, and a fuel nozzle serving as additive injection means is arranged in the small-diameter part. A NOx absorption catalytic converter as the catalytic device is arranged downstream of the small-diameter part.

In such exhaust purification apparatus, the exhaust gas from the engine flows through the DPF, the large-diameter part, the flow contraction part and the small-diameter part in the mentioned order. As the exhaust gas passes through the NOx catalytic converter, the NOx in the exhaust gas is absorbed in the NOx catalytic converter, and when the amount of the NOx absorbed reaches a predetermined value, NOx purge is executed to release the NOx from the NOx catalytic converter to be reduced. During the NOx purge, fuel injected from the fuel nozzle is supplied, together with the exhaust gas, to the NOx catalytic converter, and by using the fuel as a reducing agent, the NOx catalytic converter releases the NOx absorbed therein so that the NOx may be reduced. When the exhaust gas flows into the large-diameter part, a swirl flow of the exhaust gas is generated by the vane plate, thus furthering the mixing of the fuel with the exhaust gas.

The measure adopted in the exhaust purification apparatus of Patent Document 1 is focused on only one of the aforementioned two requirements (i.e., promotion of the mixing of fuel with the exhaust gas). Other exhaust purification apparatus have also been proposed in which measures are taken to meet both of the two requirements.

FIG. 4 illustrates the configuration of a related exhaust purification apparatus relating to published application USPGP 2009/0019842. As shown in FIG. 4, a selective reduction NOx catalytic converter 16 serving as a catalytic device is arranged downstream of a DPF 15. A venturi-shaped mixing chamber 13 is disposed between the DPF 15 and the NOx catalytic converter 16 and includes a diameter-reducing section 13a having a diameter decreasing toward the downstream side, a constricted section 13b continuously extending from the diameter-reducing section and having the smallest diameter, and a diameter-increasing section 13c continuously extending from the constricted section and having a diameter increasing toward the downstream side. A vane plate 18 for generating a swirl flow is arranged in an upstream portion of the diameter-reducing section 13a, and a urea water injection nozzle 19 serving as additive injection means is arranged immediately downstream of the vane plate 18.

The exhaust gas passed through the DPF 15 flows through the vane plate 18 in the diameter-reducing section 13a of the mixing chamber 13, whereby a swirl flow of the exhaust gas is produced. Also, urea water is injected from the injection nozzle 19 into the exhaust gas. As the exhaust gas flows through the diameter-reducing section 13a whose cross-sectional flow area gradually decreases, the flow of the exhaust gas narrows, so that the urea water is mixed satisfactorily with the exhaust gas. Subsequently, the exhaust gas flows through the constricted section 13b into the diameter-increasing section 13c. While the exhaust gas flows in this manner, the urea water in the exhaust gas is hydrolyzed due to heat of the exhaust gas, thus producing ammonia ($NH_3$). When passing through the diameter-increasing section 13c, the exhaust gas diffuses, and the ammonia is dispersedly supplied to the inlet of the NOx catalytic converter 16 arranged downstream-side of the diameter-increasing section 13c. Using the ammonia thus supplied, the NOx catalytic converter 16 selectively reduces the NOx in the exhaust gas.

Patent Document 1: Unexamined Japanese Patent Publication No. 2006-183509

DISCLOSURE OF THE INVENTION

Problems to be Solved by the Invention

In the exhaust purification apparatus of FIG. 4, the mixing of the urea water with the exhaust gas is promoted by the diameter-reducing section 13a of the mixing chamber 13, and the exhaust gas mixed with the urea water is diffused by the diameter-increasing section 13c of the mixing chamber 13, as stated above. In order to achieve satisfactory mixing and diffusion, the diameter-reducing and diameter-increasing sections 13a and 13c of the mixing chamber 13 need to have appropriate lengths in the flowing direction of the exhaust gas.

However, the exhaust system of an internal combustion engine is laid out so as not to interfere with a power train and running equipment mounted on the vehicle body, and therefore, restrictions are inevitably imposed on the installation space for the exhaust purification apparatus constituting part of the exhaust system. Since, in particular, the DPF 15, the mixing chamber 13 and the NOx catalytic converter 16 constituting the exhaust purification apparatus need to be arranged in a line because of their functionality, there has been a demand for an exhaust purification apparatus having a shorter overall length to facilitate mounting on the vehicle body. Shortening the length of the DPF 15 and of the NOx catalytic converter 16 directly leads to lowering of the purification performance. Thus, in many cases, the mixing chamber 13 has to be shortened in length to meet the above demand. Shortening the length of the mixing chamber 13 means shortening the length of the diameter-reducing section 13a or the diameter-increasing section 13c.

The related exhaust purification apparatus shown in FIG. 4 has the diameter-reducing section 13a shortened in length, and a related exhaust purification apparatus (relating to published application USPGP 2009/0019842) shown in FIG. 5 has the diameter-increasing section 13c shortened in length.

Where the diameter-reducing section 13a is shortened as illustrated in FIG. 4, no sufficient time is secured for the mixing of the urea water with the exhaust gas, with the result that the urea water fails to be satisfactorily mixed with the exhaust gas. On the other hand, where the diameter-increasing section 13c is shortened as illustrated in FIG. 5, no sufficient time is secured for the diffusion of the exhaust gas mixed with the urea water, so that the ammonia produced from the urea water cannot be uniformly supplied to the entire inlet area of the NOx catalytic converter 16. Consequently, in either case, part of the ammonia remains unused without contributing to the selective reduction of NOx by the NOx catalytic converter 16, and the NOx purification performance lowers as a result. Accordingly, there has been a demand for further improvements in the exhaust purification apparatus.

The present invention was created to solve the above problems, and an object thereof is to provide an exhaust purification apparatus for an internal combustion engine which ensures satisfactory mixing of an additive with an exhaust gas by means of a diameter-reducing section of a mixing chamber as well as satisfactory diffusion of the exhaust gas by means of a diameter-increasing section of the mixing chamber even in cases where the mixing chamber is shortened in length.

Means for Solving the Problems

To achieve the object, an exhaust purification apparatus according to the present invention comprises: a catalytic device arranged in an exhaust passage of an internal combustion engine to purify an exhaust gas from the engine by using an additive; a venturi-shaped mixing chamber arranged in the exhaust passage and located upstream of the catalytic device, the mixing chamber including a diameter-reducing section having a diameter decreasing toward a downstream side, a constricted section continuously extending from the diameter-reducing section and having a minimum diameter, and a diameter-increasing section continuously extending from the constricted section and having a diameter increasing toward the downstream side; swirl flow generation means arranged in an upstream portion of the diameter-reducing section of the mixing chamber, to generate a swirl flow of the exhaust gas; and additive injection means arranged near the swirl flow generation means on an upstream or downstream side of the swirl flow generation means, to inject an additive into the exhaust gas, wherein a distance "a" from the swirl flow generation means to the constricted section of the mixing chamber and a distance "b" from the constricted section to an inlet of the catalytic device is set such that a ratio a/b falls within a setting range of from 0.5 to 1.0.

The inventors hereof conducted a test on an exhaust purification apparatus equipped with a selective reduction NOx catalytic converter as the catalytic device and also with a urea water injection nozzle as the additive injection means, to measure the NOx purification efficiency of the selective reduction NOx catalytic converter and the amount of ammonia slip, which is an amount of ammonia leaking out from the selective reduction NOx catalytic converter without contributing to the purification of NOx, by varying the ratio a/b of the mixing chamber.

FIG. 2 shows the NOx purification efficiency characteristic obtained as a result of the test. As illustrated in FIG. 2, as the ratio a/b increases from around 0.45, the NOx purification efficiency gradually improves, and the NOx purification efficiency reaches its peak when the ratio a/b is in the vicinity of 0.95. Also, the NOx purification efficiency begins to lower as the ratio a/b increases further from around 1.0. In this manner, the NOx purification efficiency does not improve even if the ratio a/b is increased beyond 1.0 or thereabout where the NOx purification efficiency begins to lower. From this it follows that the upper limit of the ratio a/b is in the vicinity of 1.0.

FIG. 3 shows the ammonia slip characteristic obtained as a result of the test. As illustrated in FIG. 3, when the ratio a/b is in the vicinity of 0.45, the amount of ammonia slip is very large, but when the ratio a/b is increased to around 0.5 which is slightly larger than 0.45, the amount of ammonia slip sharply drops. Also, when the ratio a/b is increased further from around 1.0, the amount of ammonia slip again begins to increase. Thus, the amount of ammonia slip increases when the ratio a/b is smaller than 0.5. From this it follows that the lower limit of the ratio a/b is in the vicinity of 0.5. The fact that the amount of ammonia slip increases also when the ratio a/b is larger than 1.0 backs up the aforementioned conclusion that the upper limit of the ratio a/b is in the vicinity of 1.0, which conclusion is based on the NOx purification efficiency characteristic.

In view of the findings derived as a result of the test described above, the length of the diameter-reducing section and the length of the diameter-increasing section may be set such that the ratio a/b falls within a range from 0.5 to 1.0, even in cases where the length of the mixing chamber is shortened due to limited installation space on the vehicle body. This makes it possible to achieve a satisfactory effect of mixing the additive with the exhaust gas by means of the diameter-reducing section of the mixing chamber, as well as a satisfactory effect of diffusing the exhaust gas by means of the diameter-increasing section of the mixing chamber.

In the exhaust purification apparatus of the present invention, the catalytic device may be a selective reduction NOx catalytic converter for selectively reducing the NOx in the exhaust gas by using ammonia, and the additive injection means may inject urea water as the additive into the exhaust gas, like the exhaust purification apparatus used in the aforementioned test. In this case, the urea water is mixed well with the exhaust gas, and also the ammonia produced from the urea water is satisfactorily dispersed and supplied to the NOx catalytic converter.

Alternatively, in the exhaust purification apparatus of the present invention, the catalytic device may be a NOx absorption-type catalytic converter for absorbing the NOx in the exhaust gas and then releasing the absorbed NOx with use of fuel in the exhaust gas to reduce the NOx, and the additive injection means may inject fuel as the additive into the exhaust gas. In this case, the fuel is mixed well with the exhaust gas, and also the fuel is satisfactorily dispersed and supplied to the NOx absorption-type catalytic converter.

Advantageous Effects of the Invention

As stated above, with the exhaust purification apparatus of the present invention, it is possible to ensure both of satisfactory mixing of the additive with the exhaust gas by means of the diameter-reducing section of the mixing chamber and satisfactory diffusion of the exhaust gas by means of the diameter-increasing section of the mixing chamber even in cases where the mixing chamber is shortened in length. As a result, the exhaust purification apparatus of the present invention can properly restrain the purification performance from being lowered due to the shortened length of the mixing chamber.

BEST MODE OF CARRYING OUT THE INVENTION

An exhaust purification apparatus for an internal combustion engine according to one embodiment of the present invention will be described below.

Figure 1:
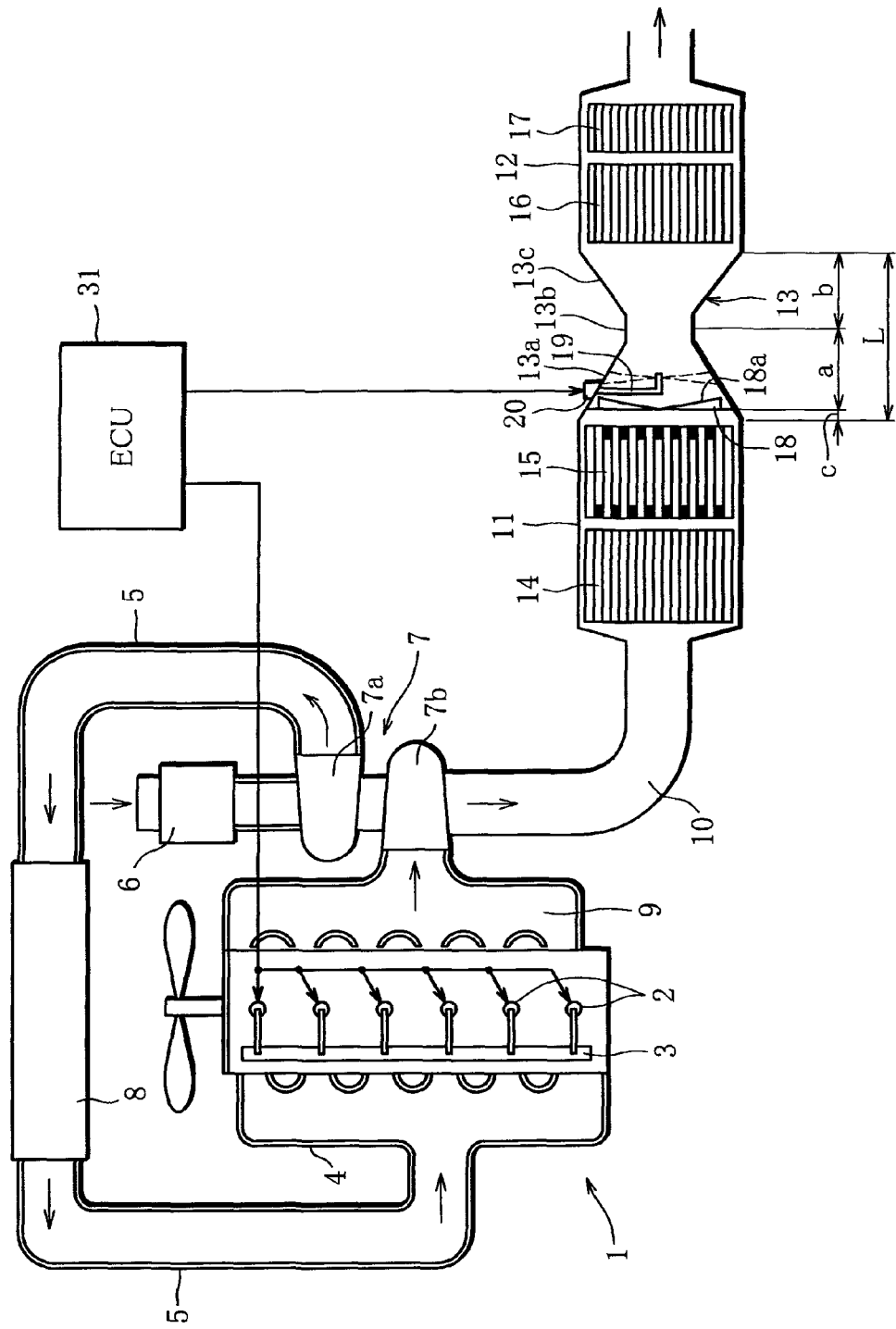
FIG. 1 illustrates an entire configuration of an exhaust purification apparatus for a diesel engine according to one embodiment of the present invention.

FIG. 1 illustrates an entire configuration of the exhaust purification apparatus according to the embodiment. In this embodiment, an inline six-cylinder diesel engine (hereinafter merely referred to as engine) 1 is used as an internal combustion engine. Each cylinder of the engine 1 is provided with a fuel injector 2 to which fuel under pressure is supplied from a common rail 3 shared by the fuel injectors 2. The fuel injectors 2 open at respective timings in accordance with operating conditions of the engine 1, to inject fuel into the corresponding cylinders.

An intake manifold 4 is attached to the intake side of the engine 1 and connected with an intake passage 5. In the intake passage 5, an air cleaner 6, a compressor 7a of a turbocharger 7, and an intercooler 8 are arranged in the order mentioned from the upstream side of the intake passage 5.

An exhaust manifold 9 is attached to the exhaust side of the engine 1. An exhaust passage 10 is connected to the exhaust manifold 9 through a turbine 7b of the turbocharger 7 aligned with and mechanically coupled to the compressor 7a.

During operation of the engine 1, intake air introduced into the intake passage 5 through the air cleaner 6 is pressurized by the compressor 7a of the turbocharger 7. The pressurized intake air flows through the intercooler 8, is distributed to the individual cylinders via the intake manifold 4 and then introduced into the respective cylinders during their suction stroke. Fuel is injected into each cylinder from the corresponding fuel injector 2 at predetermined timing such that the injected fuel is ignited to burn at timing close to the top dead center of the compression stroke of the corresponding cylinder. Exhaust gas produced as a result of the combustion is forced into the exhaust manifold 9, then rotates the turbine 7b and is discharged to the outside through the exhaust passage 10.

An exhaust purification apparatus is inserted in the exhaust passage 10. The exhaust purification apparatus comprises an upstream-side casing 11, a downstream-side casing 12, and a mixing chamber 13 formed and connecting between the casings 11 and 12. The upstream-side casing 11 is in the form of a cylinder having an axis extending in the flowing direction of the exhaust gas. Inside the upstream-side casing 11, a prestage oxidation catalytic converter 14 and a DPF (Diesel Particulate Filter) 15 are arranged in the order mentioned from the upstream side of the casing 11. The downstream-side casing 12 also is in the form of a cylinder having the same diameter as the upstream-side casing 11. A selective reduction NOx catalytic converter 16 (catalytic device) and a post-stage oxidation catalytic converter 17 are arranged inside the downstream-side casing 12 in the mentioned order from the upstream side of same.

The mixing chamber 13 is in the form of a venturi as a whole reduced in diameter at an intermediate portion thereof along the flowing direction of the exhaust gas. Specifically, the mixing chamber 13 has a diameter-reducing section 13a tapering from the downstream end of the upstream-side casing 11 with a diameter thereof gradually decreasing toward the downstream side, a constricted section 13b continuously extending from the diameter-reducing section 13a toward the downstream side while maintaining a minimum diameter of the diameter-reducing section 13a, and a diameter-increasing section 13c continuously extending from the constricted section 13b toward the downstream side with a diameter thereof gradually increasing like that of a funnel and connected to the upstream end of the downstream-side casing 12.

A vane plate 18 (swirl flow generation means) is arranged inside the diameter-reducing section 13a of the mixing chamber 13 and located slightly downstream of the upstream end of the diameter-reducing section 13a. Although not described in detail, the vane plate 18 is a disc-shaped member made of steel and having a large number of fins 18a raised by press forming such that the fins 18a are directed in a circumferential direction of the vane plate 18. Since the individual fins 18a of the vane plate 18 are bent so as to form communication holes, the exhaust gas can pass through the communication holes. When the exhaust gas passes through the communication holes, its flowing direction is changed by the individual fins 18a, with the result that a swirl flow of the exhaust gas is created within the diameter-reducing section 13a.

An injection nozzle 19 (additive injection means) is arranged immediately downstream of the vane plate 18 in the diameter-reducing section 13a. The injection nozzle 19 extends from the outer periphery of the diameter-reducing section 13a toward the center and has a distal end bent so as to be directed to the downstream side. Urea water at a predetermined pressure is supplied from a urea tank, not shown, to the injection nozzle 19 through a solenoid valve 20 attached to the outer periphery of the mixing chamber 13. As the solenoid valve 20 is actuated to open and close, the urea water supplied thereto is injected radially into the mixing chamber 13 from an injection hole, not shown, formed at the distal end of the injection nozzle 19.

The individual fuel injectors 2 and the solenoid valve 20 associated with the injection nozzle 19 are electrically connected to an ECU 31 (Electronic Control Unit). The ECU 31 is also connected with sensors and other devices.

For example, the ECU 31 sets, on the basis of engine rotation speed Ne and accelerator position θacc, a fuel injection quantity by looking up a map, not shown. Also, based on the engine rotation speed Ne and the fuel injection quantity, the ECU 31 sets fuel injection timing by looking up a map, not shown. The ECU 31 controls the operation of the fuel injectors 2 in accordance with the fuel injection quantity and the fuel injection timing, to operate the engine 1.

Further, the ECU 31 controls the operation of the solenoid valve 20 to supply ammonia ($NH_3$) to the NOx catalytic converter 16 so that a NOx purifying effect may be achieved. Specifically, the ECU 31 determines a target urea water injection quantity on the basis of the exhaust temperature detected by a temperature sensor, not shown, arranged in the mixing chamber 13. Then, in accordance with the target injection quantity thus determined, the ECU 31 controls the operation of the solenoid valve 20 to cause the injection nozzle 19 to inject the urea water in an amount corresponding to the target injection quantity.

During the operation of the engine 1, the exhaust gas discharged from the engine 1 is guided through the exhaust manifold 9 and the exhaust passage 10 into the upstream-side casing 11. When the exhaust gas thus introduced to the upstream-side casing 11 passes through the DPF 15 after passing through the pre-stage oxidation catalytic converter 14, PM (Particulate Matter) contained in the exhaust gas is caught by the DPF 15.

The exhaust gas then flows into the diameter-reducing section 13*a* of the mixing chamber 13, where a swirl flow of the exhaust gas is generated by the vane plate 18. Also, urea water is injected from the injection nozzle 19 into the swirling exhaust gas. As the exhaust gas flows through the diameter-reducing section 13*a* whose cross-sectional flow area gradually decreases, the flow of the exhaust gas narrows toward the center axis of the diameter-reducing section 13*a*, so that the urea water is mixed well with the exhaust gas. Subsequently, the exhaust gas flows through the constricted section 13*b* into the diameter-increasing section 13*c*. As the exhaust gas flows in this manner, the urea water in the exhaust gas hydrolyzes due to heat of the exhaust gas, thus producing ammonia. When passing through the diameter-increasing section 13*c* whose cross-sectional flow area gradually increases, the exhaust gas diffuses toward the outer periphery of the diameter-increasing section 13*c*. Consequently, the ammonia is satisfactorily diffused and supplied to substantially the entire inlet area of the NOx catalytic converter 16. Using the ammonia thus supplied, the NOx catalytic converter 16 selectively reduces the NOx in the exhaust gas to harmless $N_2$. The remaining surplus ammonia is treated by the post-stage oxidation catalytic converter 17.

As stated before in connection with the problems to be solved by the invention, where the length of the mixing chamber 13 in the flowing direction of the exhaust gas needs to be shortened because of, for example, limited installation space on the vehicle body, a problem arises in that the urea water fails to be mixed well with the exhaust gas if the diameter-reducing section 13*a* is shortened. On the other hand, if the diameter-increasing section 13*c* is shortened in order to reduce the overall length of the mixing chamber 13, another problem arises in that the exhaust gas fails to diffuse satisfactorily after being mixed with the urea water, making it impossible to supply ammonia to the NOx catalytic converter 16 while satisfactorily dispersing the ammonia over substantially the entire inlet area of the NOx catalytic converter 16.

These two requirements, namely, satisfactory mixing of the urea water and satisfactory dispersion of the ammonia, are in a trade-off relationship. The inventors hereof made a study of the respective lengths of the diameter-reducing and diameter-increasing sections 13*a* and 13*c* of the mixing chamber 13 and, on the presumption that there should be an optimum setting range that fulfills both of the two requirements, conducted a performance test on the NOx catalytic converter 16 by changing the individual lengths of the diameter-reducing and diameter-increasing sections 13*a* and 13*c*.

The mixing action of mixing the urea water as an additive with the exhaust gas within the diameter-reducing section 13*a* is generally dependent on the length of the diameter-reducing section 13*a*. To put it more precisely, the mixing action is correlated with the distance from the vane plate 18 to the constricted section 13*b*. Thus, a distance "a" from the vane plate 18 to the center of the constricted section 13*b*, except a length "c" (a fixed value of, e.g., 50 mm) of the upstream portion of the diameter-reducing section 13*a* located upstream of the vane plate 18, was determined as an index correlated with the length of the diameter-reducing section 13*a*.

On the other hand, the diffusing action of the exhaust gas in the diameter-increasing section 13*c* is generally dependent on the length of the diameter-increasing section 13*c*. More exactly, the diffusing action is correlated with the distance from the constricted section 13*b* to the inlet of the NOx catalytic converter 16. Thus, a distance "b" from the center of the constricted section 13*b* to the inlet of the NOx catalytic converter 16 was determined as an index correlated with the length of the diameter-increasing section 13*c*. In this embodiment, the downstream end of the diameter-increasing section 13*c* and the inlet of the NOx catalytic converter 16 coincide with each other in the flowing direction of the exhaust gas, as shown in FIG. 1. In this case, therefore, no substantial difference arises even if the distance "b" is set as a distance from the center of the constricted section 13*b* to the downstream end of the diameter-increasing section 13*c*.

Since the distances "a" and "b" are set using the center of the constricted section 13*b* as a reference position, the length of the constricted section 13*b* is eventually included in the distances "a" and "b". The manner of setting the distances "a" and "b" is, however, not limited to this alone, and the distances "a" and "b" may be set with the length of the constricted section 13*b* excluded.

The distances "a" and "b" individually vary depending on the specification, size and the like of the mixing chamber 13. Thus, if optimum values are found by testing, it is not possible to apply the optimum values to every mixing chamber 13. Accordingly, the ratio a/b of the distance "a" to the distance "b" was obtained on the basis of test results and the shape of the mixing chamber 13 was set according to the ratio a/b, as explained below.

Also, since the total length "L" of the mixing chamber 13, inclusive of the length "c", was set to a fixed value of 280 mm, the total length (=a+b) of the distances "a" and "b" naturally equals 230 mm. The value of the total length is set to be slightly smaller than an ordinary value, taking account of limited installation space on the vehicle body, for example. Thus, in order to fulfill both of the aforementioned two requirements, the lengths "a" and "b" have to be set optimally with respect to the specification of the exhaust purification apparatus on which the test was conducted.

As a performance test, NOx purification efficiency of the NOx catalytic converter 16 and an amount of ammonia leaking out from the NOx catalytic converter 16 without contributing to the selective reduction of NOx (hereinafter referred to as the amount of ammonia slip) were measured.

Figure 2:
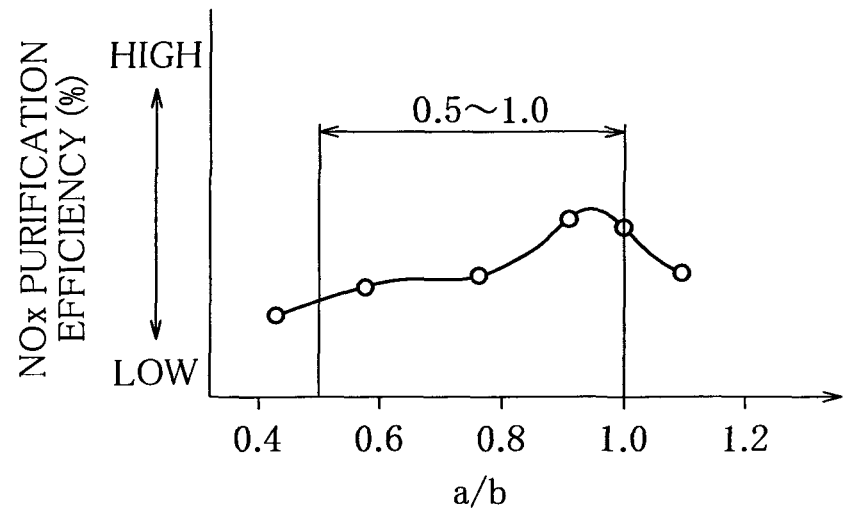
FIG. 2 shows test results on NOx purification efficiency characteristic.

FIG. 2 illustrates a NOx purification efficiency characteristic obtained by the test conducted under the aforementioned conditions. As the ratio a/b increases from around 0.45, the NOx purification efficiency gradually improves, and the NOx purification efficiency reaches its peak when the ratio a/b is in the vicinity of 0.95. Also, the NOx purification efficiency begins to lower as the ratio a/b increases further from around 1.0. Such a characteristic is observed presumably for the following reasons: As the diameter-reducing section 13*a* becomes longer due to increase of the ratio a/b, the mixing of the urea water with the exhaust gas within the diameter-reducing section 13*a* is furthered, so that the NOx purification efficiency improves. On the other hand, when the ratio a/b is larger than 1.0, the disadvantage of nonuniform supply of ammonia becomes conspicuous due to decrease in the length of the diameter-increasing section 13c, with the result that the NOx purification efficiency lowers.

In this manner, the NOx purification efficiency does not improve even if the ratio a/b is increased beyond 1.0 or thereabout where the NOx purification efficiency begins to lower. From this it follows that the upper limit of the ratio a/b is in the vicinity of 1.0.

Figure 3:
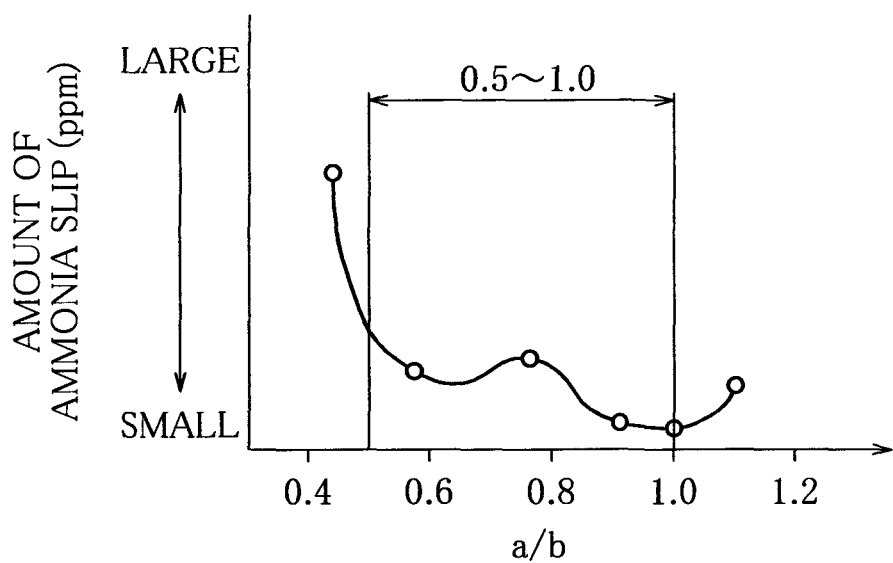
FIG. 3 shows test results on ammonia slip characteristic.
Figure 4:
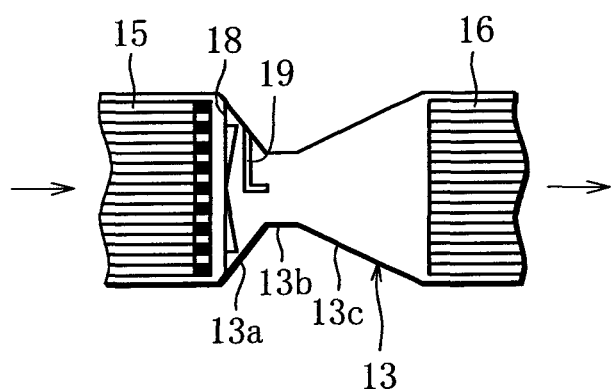
FIG. 4 illustrates a related exhaust purification apparatus whose diameter-reducing section is shortened.
Figure 5:
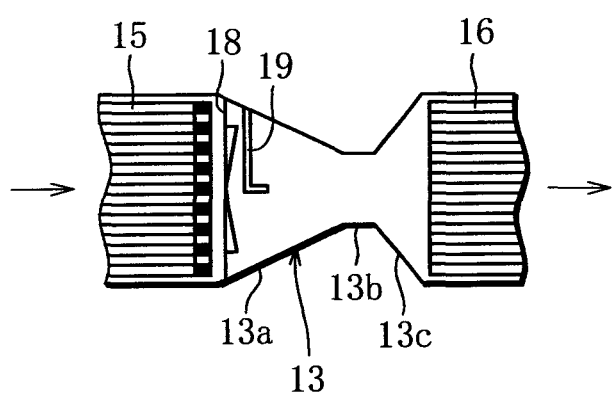
FIG. 5 illustrates another related exhaust purification apparatus whose diameter-increasing section is shortened.

FIG. 3 illustrates an ammonia slip characteristic obtained by the test conducted under the aforementioned conditions. When the ratio a/b is in the vicinity of 0.45, the amount of ammonia slip is very large, but when the ratio a/b is increased to around 0.5 which is slightly larger than 0.45, the amount of ammonia slip sharply drops. Further, when the ratio a/b is increased beyond 1.0 or thereabout, the amount of ammonia slip again begins to increase. Such a characteristic is observed presumably for the following reasons: When the ratio a/b is in the vicinity of 0.45, the length of the diameter-reducing section 13a is so short that insufficient mixing of the urea water with the exhaust gas causes ammonia slip. On the other hand, when the ratio a/b is larger than 1.0, the length of the diameter-increasing section 13c is too short, with the result that ammonia slip is caused by nonuniform supply of ammonia.

Thus, increase in the amount of ammonia slip is caused when the ratio a/b is smaller than 0.5. From this it follows that the lower limit of the ratio a/b is in the vicinity of 0.5. Further, the fact that the amount of ammonia slip increases also when the ratio a/b is larger than 1.0 backs up the aforementioned conclusion that the upper limit of the ratio a/b is in the vicinity of 1.0, which conclusion is based on the NOx purification efficiency characteristic explained above.

In the light of the findings derived as a result of the test described above, the length of the diameter-reducing section 13a and the length "b" of the diameter-increasing section 13c may be set such that the ratio a/b falls within a range from 0.5 to 1.0, even in cases where the length of the mixing chamber 13 is shortened due to limited installation space on the vehicle body, for example. This makes it possible to achieve a satisfactory effect of mixing the urea water as an additive with the exhaust gas by means of the diameter-reducing section 13a of the mixing chamber 13, as well as a satisfactory effect of diffusing the exhaust gas by means of the diameter-increasing section 13c of the mixing chamber 13. Consequently, it is possible to minimize the amount of ammonia slip while at the same time achieving satisfactory NOx purification efficiency.

While the embodiment of the present invention has been described above, it is to be noted that the present invention is not limited to the foregoing embodiment. For example, in the above embodiment, the present invention is applied to the exhaust purification apparatus of the diesel engine 1 equipped with the selective reduction NOx catalytic converter 16, in order to set the lengths of the diameter-reducing and diameter-increasing sections 13a and 13c of the mixing chamber 13 which is configured to mix the urea water with the exhaust gas and then diffuse the exhaust gas. However, the engine to which the present invention is applicable is not limited to this type of engine, and the invention can be applied to any type of engine insofar as the engine is equipped with a catalytic device to which an additive needs to be supplied.

For example, the present invention may be applied to an engine which has an absorption-type NOx catalytic converter arranged in an exhaust passage thereof to absorb NOx in the exhaust gas and in which NOx purge performed by injecting fuel as an additive into the exhaust passage needs to be periodically executed in order to cause the absorbed NOx to be released from the NOx catalytic converter and reduced. In this case, the NOx catalytic converter 16 in the exhaust purification apparatus of FIG. 1 is replaced with an absorption-type NOx catalytic converter, and fuel, instead of urea water, is injected from the injection nozzle 19. The lengths of the diameter-reducing and diameter-increasing sections 13a and 13c of the mixing chamber 13 may, however, be set in the same manner as in the foregoing embodiment. Also in this case, the same advantageous effects as those stated above can be obtained.

Also, while the lengths of the diameter-reducing and diameter-increasing sections 13a and 13c need to be set so that the ratio a/b may be within the range of 0.5 to 1.0, other dimensions such as the total length "L" of the mixing chamber 13 and the length "c" may be varied as needed. Similarly, the diameters of the upstream- and downstream-side casings 11 and 12 need not be the same and may have different diameters.

Further, it is not essential for the injection nozzle 19 to be arranged immediately downstream of the vane plate 18. That is to say, the injection nozzle 19 may be arranged upstream of the vane plate within the diameter-reducing section 13a or may be arranged downstream of the DPF 15 within the upstream-side casing 11.

EXPLANATION OF REFERENCE SIGNS 1 internal combustion engine
10 exhaust passage
13 mixing chamber
13a diameter-reducing section
13b constricted section
13c diameter-increasing section
16 NOx catalytic converter (catalytic device)
18 vane plate (swirl flow generation means)
19 injection nozzle (additive injection means)
a, b distance

The invention claimed is:

1. An exhaust purification apparatus for an internal combustion engine, the exhaust purification apparatus comprising:
a catalytic device arranged in an exhaust passage of the engine to purify an exhaust gas from the engine with an additive;
a venturi-shaped mixing chamber arranged in the exhaust passage upstream of the catalytic device, the mixing chamber including a diameter-reducing section having a diameter decreasing toward a downstream side, a constricted section continuously extending from the diameter-reducing section and having a minimum diameter, and a diameter-increasing section continuously extending from the constricted section and having a diameter increasing toward the downstream side;
a swirl generator arranged in an upstream portion of the diameter-reducing section of the mixing chamber to generate a swirl flow of the exhaust gas; and
an additive injection nozzle arranged near the swirl generation device, either on an upstream or downstream side of the swirl generator to inject the additive into the exhaust gas,
wherein a distance "a" from the swirl generator to a point in the constricted section of the mixing chamber and a distance "b" from the point in the constricted section to an inlet of the catalytic device is set so that a ratio a/b falls within a setting range of from 0.5 to 1.0 to restrict ammonia slip from the catalytic device, and
wherein at the setting range of the ratio a/b, the catalytic device shows exhaust purification efficiency equal to or higher than a predetermined value and also an amount of the ammonia slip from the catalytic device is equal to or smaller than a predetermined amount when at least one of the distance "a" or the distance "b" is varied under predetermined conditions.

2. The exhaust purification apparatus according to claim 1, wherein:
   the additive injection nozzle injects urea water as the additive into the exhaust gas, and
   the catalytic device is a selective reduction NOx catalytic converter that selectively reduces NOx in the exhaust gas using ammonia obtained due to hydrolyzation of the urea water with heat from the exhaust gas.

3. The exhaust purification apparatus according to claim 1, wherein:
   the catalytic device is a absorption-type NOx catalytic converter for absorbing NOx in the exhaust gas and then releasing the absorbed NOx with use of fuel in the exhaust gas to reduce the NOx, and
   the additive injection nozzle injects the fuel as the additive into the exhaust gas.

* * * * *